Dec. 20, 1938. R. CORSEPIUS ET AL 2,140,667
APPARATUS FOR CONTROLLING POWER OPERATED VALVES
Filed Dec. 9, 1936

Inventors:
Rudolf Corsepius
and
Hans Protzen
By John B. Brady
attorney.

Patented Dec. 20, 1938

2,140,667

UNITED STATES PATENT OFFICE 2,140,667

APPARATUS FOR CONTROLLING POWER OPERATED VALVES

Rudolf Corsepius, Berlin-Charlottenburg, and Hans Protzen, Berlin-Lichterfelde, Germany, assignors to Bamag-Meguim Aktiengesellschaft, Berlin, Germany Application December 9, 1936, Serial No. 115,058 In Germany December 14, 1935

6 Claims. (Cl. 137—144)

This invention relates to apparatus for controlling the opening and closing of power operated shut-off devices of an adsorber plant employing active carbon as adsorbing material.

It has recently become known to obtain benzene from benzene laden gases, e. g. town gas, with the aid of active carbon as adsorption material. The gas to be freed from benzene is caused to pass through a layer of active carbon in a containing vessel, the so-called adsorber. After the carbon has sufficiently adsorbed the gas, the gas supply is shut off and steam is admitted into the adsorber, which steam forces the benzene out of the carbon. The mixture obtained, consisting of water vapour and benzene, is led through a condenser into a separator wherein the benzene is separated from the water, this being followed by further treatment. When all the benzene has been expelled, the active carbon in the adsorber is dried with the aid of hot gases. For this purpose the gas freed of benzene is itself utilized, after same has been brought to a high temperature. Thereupon the hot active carbon is cooled with the aid of cold gas, which preferably is also gas freed of benzene.

Usually, in order to be able to carry on a continuous operation, a plurality of such adsorbers are employed and the procedure is such that while in at least one adsorber the active carbon is being charged with benzene, in at least one other the steaming is being effected, and in the others the drying and cooling is being effected, all in accordance with the manner of operation peculiar to the active carbon process which involves the four phases, charging, steaming, drying and cooling. The active carbon process thus makes it necessary to connect each adsorber to individual conduits for the supply and discharge of the gas, steam and so forth through shut-off devices, there being eight conduits with respective shut-off valves for each adsorber. The plant is generally operated by hand, and it is desirable to provide automatic control for the individual shut-off devices. However, the difficulty is encountered that the active carbon process makes it necessary to shut simultaneously two valves for each adsorber and directly thereafter to open another group of valves. In this connection it is most important to avoid the opening of those valves that are to be opened prior to the closing of those valves that are to be closed. For example, the steam conduit or conduits must not be opened prior to the gas supply conduit or conduits to the adsorber or adsorbers being completely and securely shut. It might be possible to avoid danger by allowing a longer interval between the closing step and the following opening step, but in plants where strictly timed change over periods are adopted this would lead to considerable loss of output because the adsorber to be connected up would be out of action during this interval.

To avoid these defects and as applied to an adsorber plant of the character stated, the present invention provides that the electromotor-, hydraulic-, or pneumatic-mechanisms for operating the shut-off devices are controlled by a source of power which, upon being started as by hand or a time switch, causes two shut-off devices in two associated conduits leading to and from an adsorber to be shut, the controlling source of power being cut-out at the same time, while, when the said shut-off devices have been shut, the controlling source of power is thereby again rendered operative and causes two further shut-off devices to be opened in accordance with the required manner of operation of the plant. A signalling system may be associated with the control arrangement, so that the position of the shut-off devices and therewith the operative condition of the adsorbers at any one time is ascertainable.

By way of example an embodiment of the invention is illustrated on the accompanying drawing to which reference will now be made.

Figures 1, 2:
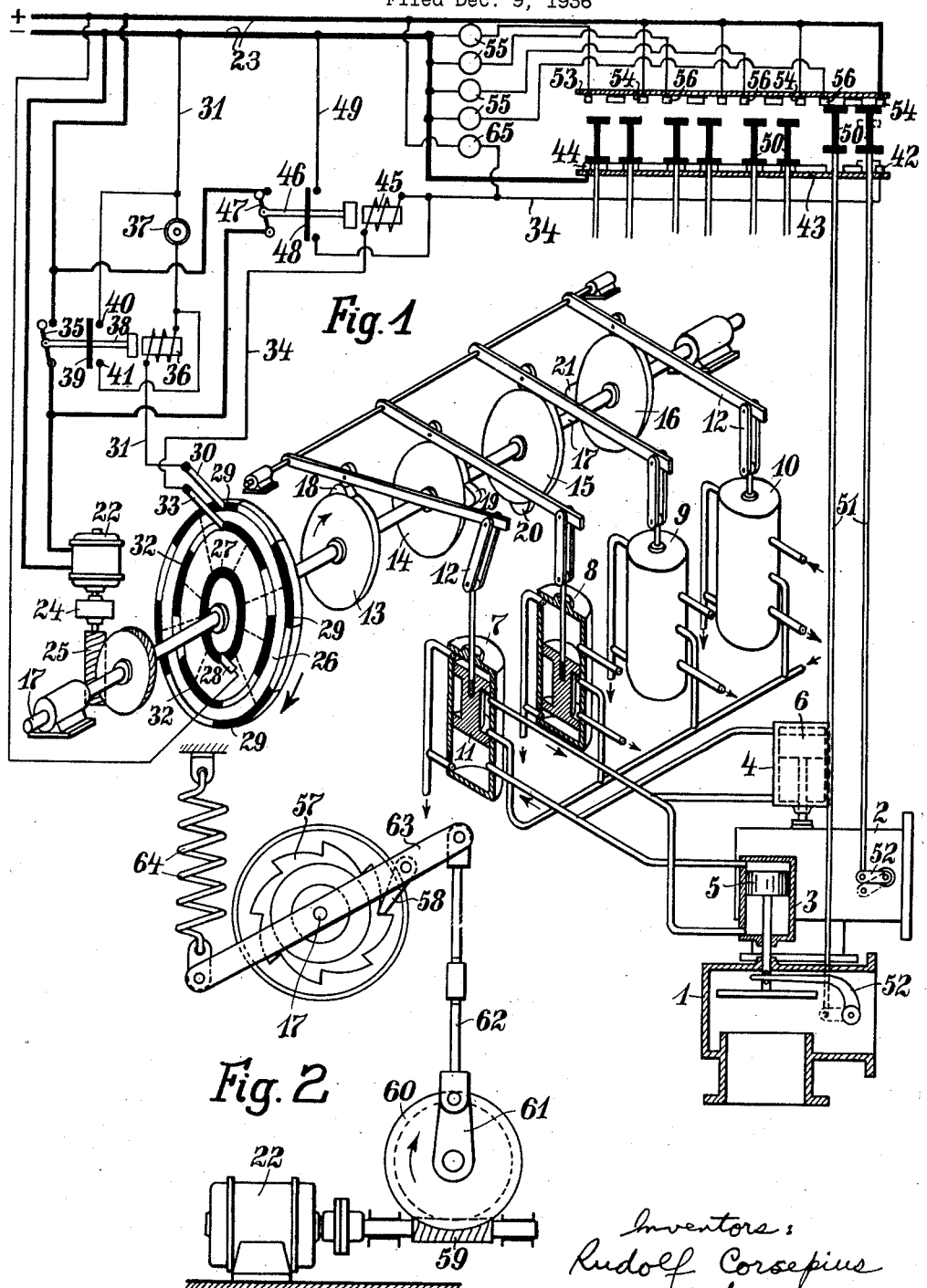
Fig. 1 shows the control arrangement schematically.
Fig. 2 illustrates a feature of the control motor drive hereinafter explained.

Of the eight valves disposed in the appropriate conduits in association with each adsorber the drawing shows two, denoted by the references 1 and 2, which are opened and closed by means of operating cylinders 3 and 4 having pistons 5 and 6 whereon the valve members are mounted. Opening and closing is effected by means of pressure gas or pressure liquid admitted to the operating cylinders and the control is brought about by control cylinders 7, 8, 9 and 10, each of which controls two valves at a time, as in the present example the cylinder 7 controls the two valves 1 and 2. According to the position of the control piston 11 in the cylinder 7 the pressure medium is conducted to below or to above the pistons 5, 6 in the operating cylinders 3, 4 and thereby the valves are opened or closed.

With each adsorber are associated eight valves and accordingly four control cylinders. For several adsorbers several such groups are required. The movement of the control piston 11 in the control cylinders 7—10 is brought about by levers 12 operated by cam discs 13, 14, 15, 16 fast on a shaft 17. The cams 18, 19, 20 and 21 on each group of discs are progressively staggered or offset 90° in accordance with the four operations to be effected and so that one control cylinder is actuated at any one time. The shaft 17 is periodically driven through a ratio speed gear 24 and a worm 25 by an electric motor 22 which may be connected to electric mains 23. For this purpose there is fixed to the shaft 17 a slip ring 27 and also a rotary switch 26 comprising two rings each having alternately conductive and non-conductive segments. The slip ring is connected through a brush 28 to the positive of the mains 23. The conductive segments 29 of the outer ring of the switch 26 connect through a brush 30 to a conductor 31 leading to the negative of the mains 23. The conductive segments 32 of the inner ring of the switch 26 connect through a brush 33 to a conductor 34. Said outer and inner rings each comprise four conductive and four non-conductive segments, the conductive segments of the one ring being disposed opposite the non-conductive segments of the other ring. The motor 22 is connected to the mains 23 through the switch lever 35 of a magnet switch whose magnet 36 is included in the conductor 31, in which is also disposed a master switch represented by a press button 37. The armature 38 of the switch lever 35 carries a contact piece 39 which may bridge the press button 37 by touching contacts 40, 41.

As through the connectors of a conductive segment 29 with the slip ring 27 the circuit is closed when the push button 37 is operated, the magnet 36 is energized to connect the motor 22 to the mains 23 via the switch lever 35. The motor 22 and therewith the shaft 17 begin to rotate and the current conducting segment 29 which is under the brush 30 is turned further away. The aforesaid conductor 34 leads to the end control contact 42 of a series of contacts on a rail 43. The first contact 44 of this series is connected to the negative of the mains 23. In the conductor 34 is disposed a magnet 45 capable of operating a switch lever 47 through an armature 46 and adapted to connect the conductor 34 through a switch member 48 and a conductor 49 directly to the negative of the mains. The motor 22 may be connected through this switch lever 47 to the mains 23 in exactly the same manner as through the switch lever 35.

For closing the switch lever 47 the magnet 45 must be energized and for this purpose it is necessary to close the circuit through the whole series of contacts on the rail 43, which means that all the I-shaped contacts 50 shown must be down. Each individual I-shaped contact 50 is disposed at the upper end of a rod 51 which is coupled through a lever 52 with the pertaining valve member of the individual valves 1, 2, etc. If either or both of two associated valves are open the series of contacts on the rail 43 is interrupted and the magnet 45 cannot be energized and the lever 47 cannot be closed. Conversely, as soon as all valves and therewith the series of contacts on the rail 43 are closed, the switch 47 obviously becomes closed at once.

Opposite the contact rail 43 there is a signal contact rail 53. Individual contacts 54 of this rail are connected to the positive of the mains, while other contacts 56 of the contact rail 53 are connected through signal lamps 55 to the negative of the mains 23. Individual contacts of this rail serve as bridging contacts. The lamps 55 are lighted up as soon as I-shaped contacts 50 belonging to a pair of valves close the circuit. The individual lamps 55 therefore show the open position of a pair of valves and therewith the operative position of the adsorber at any one time. A lamp 65 by reason of the circuit connection shown indicates the closing position of all the valves. The lamps 55 may, of course, be disposed on a central switchboard together with the push button 37, so that the control may be effected and seen at a glance therefrom.

Where opposite contact rails 43 and 53 are provided and switch rods 51 are employed, it is preferable to introduce a reducing lever 52, as shown, in order to avoid too great a spacing of the two rails, which would have to correspond to the valve stroke and would involve a sprawling construction. If the leverage is suitably selected the distance apart of the two switch rails 43 and 53 may be kept very small. Increased sensitiveness of the switch to influences of movement through the valve is achieved by the fact that the path of the lever 52 is a short arc of a small circle. Fine adjustment is possible to cause the switch to respond only when the valve is completely closed or completely opened.

The described switching arrangement, which is influenced by the individual valves 1, 2, etc., may be varied in many different ways; thus, for example, by subdividing the two contact rails into individual switches associated with the respective valves, sometimes even with the interposition of auxiliary circuits.

The foregoing presentation has been chosen particularly for the reason that the switching process is the easiest to survey and the simplest to explain. The method of operation of the control is as follows:—

Assume that the two valves 1 and 2 are in the gas supply conduit to the adsorber and both valves are open as shown. The position of both valves is indicated by one of the lamps 55, since the I-shaped contacts 50 are raised and close the corresponding circuit for the lamp. The operating shaft 17 is stationary, since the motor 22 is not energized, and the switches 35 and 47 are open. Therefore, for the time being the adsorber is charged with benzene. When the charging process is completed the operator of the plant presses the button 37. Electrical connection is then made from the negative of the mains 23 through the conductor 31, the brush 30, a conductive segment 29, the connector of this contact segment with the slip ring 27 and the brush 28 to the positive of the mains 23. The magnet 36 is thus energized, attracts the armature 38 and closes the switch lever 35. Since the member 39 touches both contacts 40, 41, the push button 37 is bridged and in spite of the push button being released the magnet remains energized. In this way the motor 22 is energized and rotates the shaft 17 clockwise. The conductive segment 29 thereupon slides from under the brush 30, so that the brush makes contact with the following insulating segment. Thereby the circuit which energizes the magnet 36 is interrupted, the armature 38 retracts and the switch lever 35 opens under gravity or under the action of a spring, so that the motor 22 is stopped after ⅛th of a revolution of the shaft 17. Owing to this partial revolution the cam 18 of the disc 13 slides away from under the lever of the lever system 12 and the lever system drops, causing the piston 11 in the cylinder 7 to slide down whereupon the pressure medium is forced through the pressure conduits to above the pistons 5 and 6 in the operating cylinders 3 and 4. By this means the valves 1 and 2 are shut. As the two switch rods 51 are simultaneously moved and therewith the contacts 50, the latter, after the valve members of the valves 1 and 2 have reached their seats, close the circuit through the contact rail 43, said circuit leading from the negative of the mains through the conductor 34, the brush 33, the conductive segment of the inner ring 32 that has now come under said brush, the connecting lead to the slip ring 27 and the brush 28 to the positive of the mains. Thereby the magnet 45 is energized, the armature 46 is attracted and the switch 47 is closed. Consequently the motor 22 is again energized and the operating shaft 17 is rotated through a further ⅛th revolution when the switch lever 47 is opened because the circuit is broken by the brush 33 contacting with the insulating segment following the conducting segment that was under the brush during this partial revolution. Meanwhile the cam 21 of the disc 16 has been brought under the lever system 12 of the cylinder 10 and thereby the next pair of valves are caused to open, so that now follows the period of steaming of the adsorber. The raising of the contacts 50 corresponding to this pair of valves closes the circuit of the lamp 55 that indicates to the operator steaming is in progress. Of course, the previous lowering of the contacts 50 pertaining to the valves 1, 2 cut out the signal lamp 55 for these valves.

When the steaming is completed the operator again presses the button 37 and the shaft is rotated through a further ⅛th revolution whereupon the valves in the steam conduit are closed in a manner that will now be apparent. Next, owing to the action of the corresponding contacts upon the switch rail 43 the shaft 17 will be rotated through still a further ⅛th revolution and thereby the cylinder 9 is influenced to open the valves in the hot gas conduit. After the drying of the active carbon in the adsorber has been completed the valves in the drying gas conduit are closed by actuating the press button when the corresponding contacts 50 cause the valves of the cold gas conduit to be opened to cool the carbon in the adsorber. This period of cooling is then again followed by the charging period and so forth.

It will be seen from the construction of the control device that it is impossible to effect the opening of a pair of valves by the operation of the push button prior to the previous valves in the sequence of the operation being closed. The circuit passing through the brush 30 is broken as soon as the shaft 17 has been rotated through ⅛th revolution. But the motor can only be switched on through the circuit including the brush 33. This, however, is only possible with the aid of the contacts 50. The movements are positively controlled. This positiveness in the movement of the valves assures with certitude the closing of all valves which have been open during the foregoing period of operation prior to the opening of the valves belonging to the next period of operation being started. Troubles are easily located with the aid of the lamps. It can be seen at once whether a valve lingers between its two end points, whether this is due to insufficient supply of energy for the movement or to other reasons. Since, moreover, during the uninterrupted movement of a shut-off device further change over operation is not possible, a wrong change over operation is avoided with certitude. At the same time the waiting period involved by the change over is reduced exclusively to the period necessary for the movement of the armatures.

For the described change over it is important that the shaft 17 be always rotated only through ⅛th of a revolution. The rotation of the shaft 17 is therefore preferably effected by means of a ratchet wheel 57 and a pawl 58, as shown in Fig. 2. The motor 22 drives through a worm 59 a worm wheel 60 and this moves a crank 61, thereby pulling down a crank rod 62 which engages a balance beam 63 mounted on the shaft 17. In so doing the pawl 58 rotates the ratchet wheel 57 through one of its eight teeth. As the motor continues to rotate owing to its inertia, braking is necessary, this being achieved by a spring 64 which engages the other end of the balance beam 63.

Instead of a push button switch 37, which is operated at predetermined intervals by an operator, the master switch may be a time switch employed to switch on the motor after predetermined periods of time, which may be uniform, or different for each of the successive operations, as required. In this manner a fully automatic plant may be provided. Further, instead of using segment rings disposed on the shaft 17, the circuits of the magnets 36 and 45 may be operated by some other switching device mounted on said shaft. The important point is that the switching device shall interrupt the circuit, for example the circuit in which the magnet 36 is disposed, after ⅛th of a revolution and at the same time shall enable the other circuit to be closed when the contacts 50 are operated and vice versa.

We claim:—

1. Control means for a plurality of pairs of shut-off elements located in a like plurality of associated supply and outlet conduits of an active carbon plant, and electromotive-, hydraulic- or pneumatic-power mechanisms operating said elements, comprising, in combination, a single electric motor, control means actuated by the motor for operating pairs in sequence of said power mechanisms, two parallel power circuits through the motor, switch means operable by the motor to bridge one and break the other alternately of said parallel circuits, a master switch in one of said circuits for energizing the motor temporarily through the switch means while it effects the closure of one pair of the shut-off elements, contacts in the other of said circuits, and means movable by each of said pair of shut-off elements to jointly bridge the contacts only when both of said pair of shut-off elements attain their closed positions to energize the motor temporarily through the switch means while it effects the opening of another pair of the shut-off elements.

2. Control means for a plurality of pairs of shut-off elements located in a like plurality of associated supply and outlet conduits of an active carbon plant and the electromotive-, hydraulic- or pneumatic-power mechanisms operating said elements, comprising, in combination, a rotary controller for actuating pairs in sequence of said power mechanisms, an electric motor operatively connected to the controller, two parallel power circuits through the motor, switch means turnable with the controller through a limited angle to bridge one and break the other alternately of said parallel circuits, a master switch in one of said circuits for energizing the motor temporarily through the turnable switch means while it effects the closure of one pair of the shut-off elements, control contacts in the other of said circuits and means movable by each of said pair of shut-off elements to jointly bridge the control contacts only when both of said pair of shut-off elements attain their closed positions to energize the motor temporarily through the turnable switch means while it effects the opening of another pair of the shut-off elements.

3. Control means for a plurality of pairs of shut-off elements located in a like plurality of associated supply and outlet conduits of an active carbon plant, and electromotive-, hydraulic- or pneumatic-power mechanisms operating said elements, comprising, in combination, a single electric motor, control means actuated by the motor for operating pairs in sequence of said power mechanisms, two parallel power circuits through the motor, switch means turnable by the motor through a limited angle to bridge one and break the other alternately of said parallel circuits, a master switch in one of said circuits for energizing the motor temporarily through the turnable switch means while it effects the closure of one pair of the shut-off elements, contacts in the other of said circuits, and means movable by each of said pair of shut-off elements to jointly bridge the contacts only when both of said pair of shut-off elements attain their closed positions to energize the motor temporarily through the turnable switch means while it effects the opening of another pair of the shut-off elements, a plurality of signal lamp circuits, and contacts in said circuits disposed to be bridged by said movable means in the limit positions of the shut-off elements.

4. Control means for a plurality of pairs of shut-off elements located in a like plurality of associated supply and outlet conduits of an active carbon plant, and the electromotive-, hydraulic- or pneumatic-power mechanisms operating said elements, comprising, in combination, a rotary controller for actuating pairs in sequence of said power mechanisms, an electric motor operatively connected to the controller, two parallel power circuits through the motor, switch means turnable with the controller through a limited angle to bridge one and break the other alternately of said parallel circuits, a master switch in one of said circuits for energizing the motor temporarily through the turnable switch means while it effects the closure of one pair of the shut-off elements, control contacts in the other of said circuits and means movable by each of said pair of shut-off elements to jointly bridge the control contacts only when both of said pair of shut-off elements attain their closed positions to energize the motor temporarily through the turnable switch means while it effects the opening of another pair of the shut-off elements, a plurality of groups of signal contacts disposed to be bridged by said movable means when both of a pair of shut-off elements attain their fully open positions, signal lamp circuits severally containing each of said groups of signal contacts, and another signal lamp circuit containing all of said control contacts so as to be completed when all of the pairs of shut-off elements attain their closed positions.

5. Control means for a plurality of pairs of shut-off elements located in a like plurality of associated supply and outlet conduits of an active carbon plant, and the electromotive-, hydraulic- or pneumatic-power mechanisms operating said elements, comprising, in combination, a rotary controller for actuating pairs in sequence of said power mechanisms, an electric motor, a pawl-and-ratchet-wheel mechanism operatively connecting the controller and the motor, the ratchet wheel having a number of teeth corresponding to the number of operations in the control cycle, two parallel power circuits through the motor, switch means turnable stepwise with the controller to bridge one and break the other alternately of said parallel circuits, a master switch in one of said circuits for energizing the motor temporarily through the turnable switch means while it effects the closure of one pair of the shut-off elements, control contacts in the other of said circuits and means movable by each of said shut-off elements to jointly bridge the control contacts only when both of said pair of shut-off elements attain their closed positions to energize the motor temporarily through the turnable switch means while it effects the opening of another pair of the shut-off elements.

6. Control means for a plurality of pairs of shut-off elements located in a like plurality of associated supply and inlet conduits of an active carbon plant, and fluid-pressure mechanisms operating said elements, comprising, in combination, a camshaft cyclically controlling pairs of said mechanisms, an electric motor, a pawl-and-ratchet-wheel mechanism operatively connecting the camshaft and the motor, the ratchet wheel having a number of teeth corresponding to the number of operations in the controlled cycle, two parallel power circuits through the motor, switch means turnable with the camshaft through a limited angle to bridge one and break the other alternately of said parallel circuits, a master switch in one of said circuits for energizing the motor temporarily through the turnable switch means while it effects the closure of one pair of the shut-off elements, control contacts in the other of said circuits and means movable by each of said shut-off elements to jointly bridge the control contacts only when both of said pair of shut-off elements attain their closed positions to energize the motor temporarily through the turnable switch means while it effects the opening of another pair of the shut-off elements.

RUDOLF CORSEPIUS.
HANS PROTZEN.